(No Model.)　　　　　　J. H. GREENSTREET.　　　　3 Sheets—Sheet 3.
BOX MAKING MACHINE.
No. 579,574.　　　　　　　　　Patented Mar. 30, 1897.
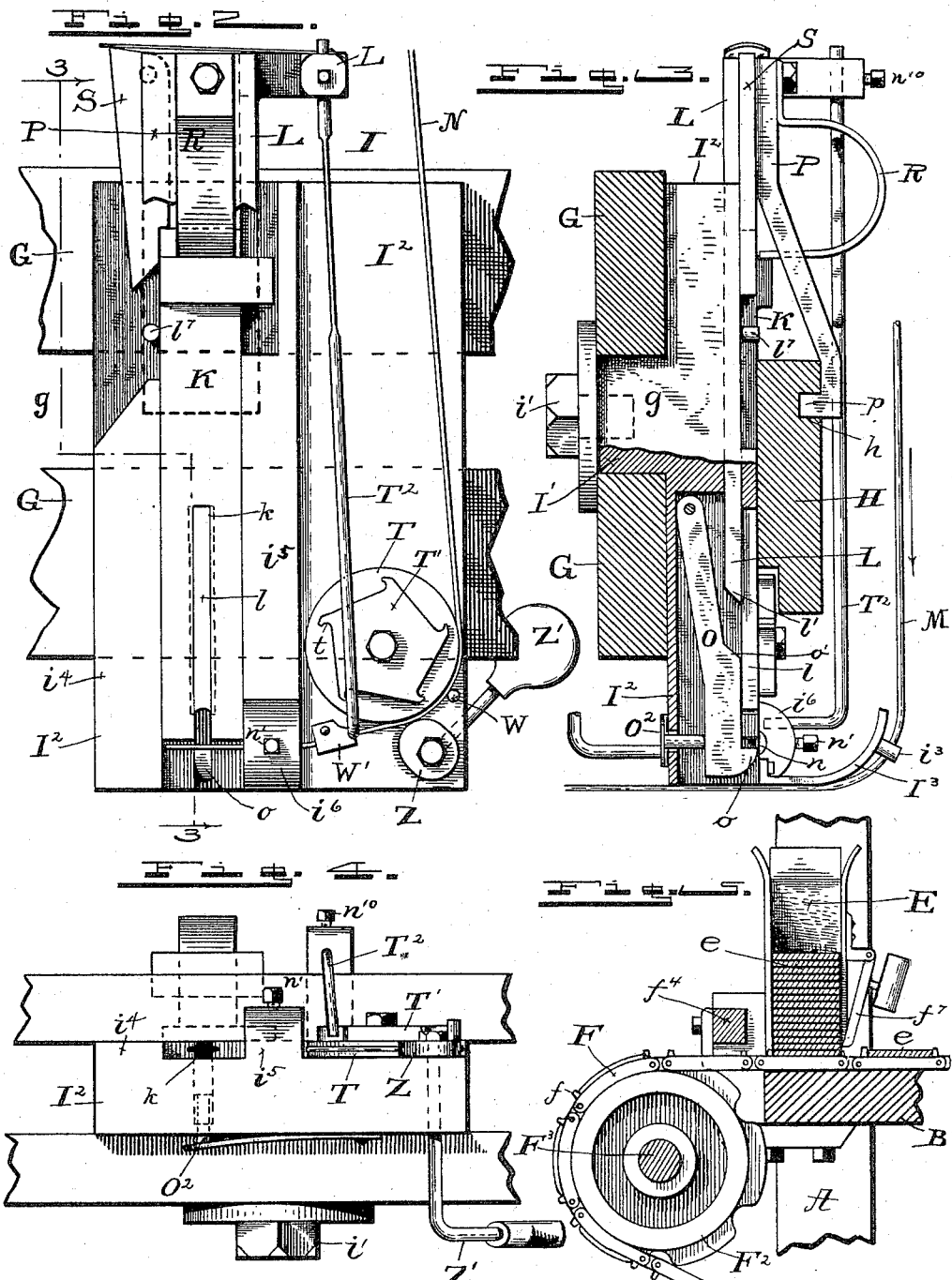

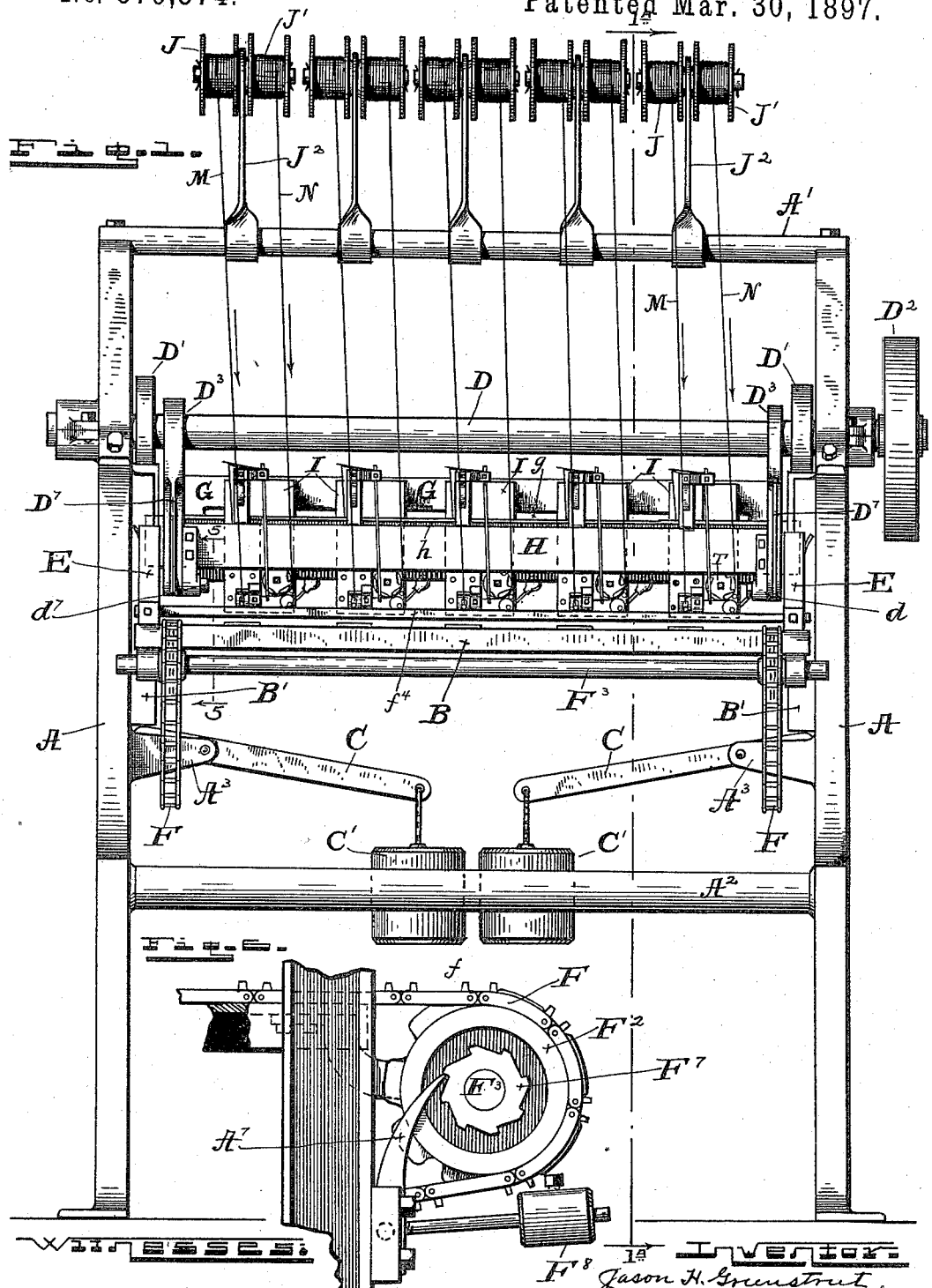

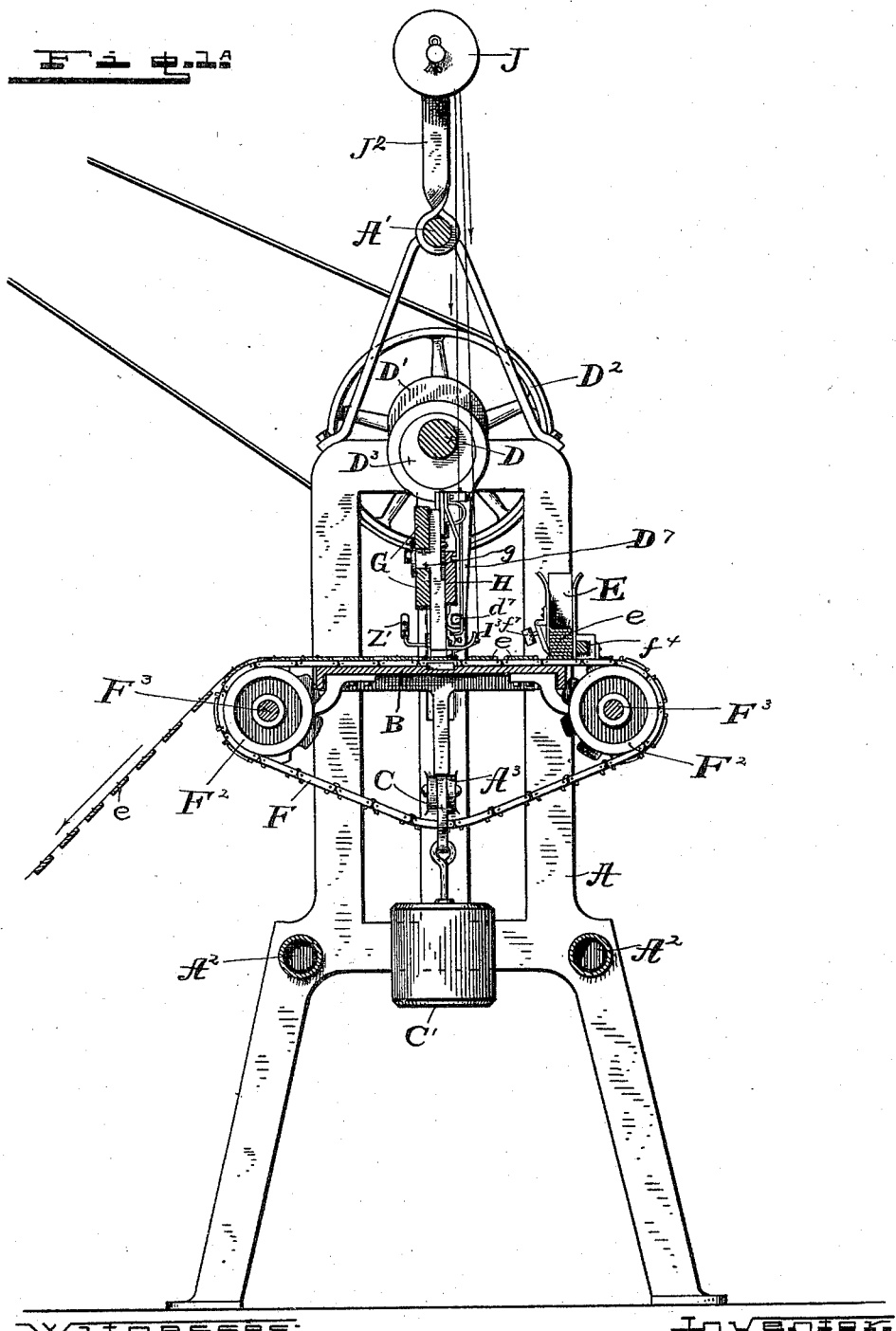

UNITED STATES PATENT OFFICE.

JASON H. GREENSTREET, OF INDIANAPOLIS, INDIANA.

BOX-MAKING MACHINE.

SPECIFICATION forming part of Letters Patent No. 579,574, dated March 30, 1897.

Application filed July 6, 1896. Serial No. 598,184. (No model.)

*To all whom it may concern:*

Be it known that I, JASON H. GREENSTREET, a citizen of the United States, residing at Indianapolis, in the county of Marion and the State of Indiana, have invented certain new and useful Improvements in Box-Making Machines; and I do hereby declare the following to be a full, clear, and exact description of the invention, such as will enable others skilled in the art to which it appertains to make and use the same.

The object of this invention is to provide a machine for manufacturing the slat-and-wire material required in the production of the shipping-cases described in Letters Patent No. 547,486, issued to me. The material from which these cases are constructed consists of a series of wooden slats connected by means of transverse wires which are fastened to the slats by staples; and the object of this invention is to provide mechanism whereby the slats and wires can be fed into the machine and the machine will assemble them in proper order, make the staples as they are needed, and drive them so as to fasten the cross-wires to the slats.

I accomplish the objects of this invention by the mechanism illustrated in the accompanying drawings, in which—

Figure 1 is a view in front elevation of my complete machine; Fig. 1$^A$, a vertical section on the line 1$^a$ 1$^a$ of Fig. 1; Fig. 2, an enlarged detail of the mechanism for cutting off the wire, forming it into staples, and driving them. Fig. 3 is a side or edge view, partially in section, of the parts shown in Fig. 2, the section being on the line 3 3 of Fig. 2, the view being in the direction of the arrows. Fig. 4 is an under side view of the mechanism shown in Fig. 2. Fig. 5 is a detail on the line 5 5 of Fig. 1, looking in the direction of the arrows. Fig. 6 is a detail of the mechanism for moving the belt for carrying the slats into position under the stapling device.

Similar letters of reference indicate like parts throughout the several views of the drawings.

The frame of my machine consists of the two vertical standards A, which are joined together by means of the upper transverse bar A' and the lower transverse bars A$^2$.

B is a horizontal bed-plate having the vertical end slides B', which work in suitable ways in the standards A.

A$^3$ are inside brackets integral with the standards A and form the bearings for levers C. The inner ends of the levers C are weighted at C', and the opposite or outer ends of the levers bear against the lower ends of the slides B. The masses C' are of sufficient weight to raise the platform and hold it in raised position until pressed down by the overpowering force of the cams D'. Secured to the top of the bed-plate are the three-sided guides E. These are two in number and are placed on opposite sides of the bed-plate with their open sides facing inward or toward each other. The slats $e$ are stacked on top of each other flat side up, with their ends resting in the guides.

Passing across the upper face of the bed-plate and underneath the slats $e$ are the two link-belts F. The belts are on opposite sides of the machine and have spurs or upward projections $f$, which engage the under slat as the belts move across the bed-plate and carry the slat forward. The belts pass over the sprocket-wheels F$^2$, mounted on shafts F$^3$, supported from hangers depending from the under side of the bed-plate. On one of the shafts F$^3$, as shown in Fig. 6, is a ratchet-wheel F$^7$, and as the bed-plate to which the shaft is fastened has a vertically-reciprocating movement the ratchet-wheel F$^7$, being mounted on the shaft, has a reciprocating movement also, and in order to give a rotary movement to the shaft F$^3$, such as will carry the chains F forward, I provide a pawl or ratchet A$^7$, which is pivotally secured to the frame A of the machine and is forced out into engagement with the ratchet-wheel by means of the weighted arm F$^8$. The several parts are so proportioned as to cause the belt to move and carry forward a slat at the right time to meet the stapling device, hereinafter to be described.

The slats forming the corners of one class of my shipping-package are narrower in width and of greater thickness than the other slats, and this irregularity makes necessary the hinged and weighted finger $f^7$, Fig. 5, to keep the slats from feeding out more than one at a time. The fingers $f^7$ are two in number, one for each side of the machine, and are hinged at their upper ends to the inner sides of the guides E. The fingers are weighted so as to force their free lower ends against the pile of slats in the guides E and press back all but the lower slat, which is thin enough to pass under the end of the finger without contact; but when a thicker slat reaches the belt and is carried out the positive force given it by the belt is sufficient to force the hinged finger back out of its way.

The bar $f^4$ connects and braces the guides E.

G is a vertical plate connecting the two standards A and secured to the standards so as to be held immovable. The plate is provided with the central longitudinal slot $g$.

D is a shaft mounted on the standards A. It is driven by belt connection from any source of power with the pulley $D^2$. The cams $D'$ are mounted on and turn with this shaft.

$D^3$ are eccentrics mounted on the shaft D and arranged so as to act oppositely to the cams $D'$. The eccentric-rings terminate with the stems $D^7$, which in turn are pivotally secured at $d^7$ to a plate H and impart a reciprocating movement to the said plate. The ends of the plate enter vertical ways in the frame of the machine, whereby a vertical movement of the plate H is secured. The plate is provided with the groove $h$, whereby the staple forming and driving mechanism of the heads I is connected to the plate and actuated by the reciprocating movement of said plate H.

There will be as many of the staple forming and driving heads I used on the machine as there are transverse binding-wires used to hold the slats together, and each one of these heads will employ two wires—one to form the transverse binding-wire and the other to provide the material for making the staples by which the transverse wires are fastened to the slats. The wires are wound on spools J and $J'$, which are supported in pairs on the standards $J^2$, fastened to the cross-bar $A'$. The heads I are secured to the bar G by means of a flanged extension $I'$, integral with the body-plate $I^2$, which fits into the slot $g$ in the plate G and is held there by the washer and bolt $i'$. This method of attachment permits of the adjustment of the heads longitudinally of the bar G in a very simple manner, whereby the distance between the transverse wires on the slats can be readily adjusted. M represents these transverse or binding wires for holding the slats together, and N represents the wires from which the staples are made.

$I^3$ is a bracket secured to the lower end of the plate $I^2$. It is curved, as shown, and is provided with an eyelet $i^3$, through which the wire M is threaded. The wire M is brought down from its spool J, passes through the eyelet $i^3$, and thence back under the plate $I^2$, where it is brought into contact with the slats and secured to them by means of staples, the mechanism for the construction and application of which I will now describe.

$i^4$ and $i^5$ are parallel extensions from the face of the plate $I^2$ and form guides for the foot K. The foot K has a reciprocating longitudinal movement between the said guides and is formed with the longitudinal slot $k$ in its lower end. Back of the foot K and between said foot and the plate $I^2$ is what I will designate as the "hammer-bar" L, having a flange $l$, which fits into the slot $k$ in the manner as shown in Figs. 2 and 3. The sides of the slot $k$ are grooved longitudinally to engage tongues on the sides of the flange. Opposite the flange $l$ in the plate $I^2$ is a slot in which a lever O is pivotally secured in the manner as shown in Fig. 3, and the lower end of the lever is provided with an outwardly-extended hook $o$. The hammer-bar L for a suitable distance back of the flange $l$ is slotted to admit the lever O, and the top of the slot in the hammer-bar is beveled at $l'$ to contact with the beveled outline $o'$ of the lever and push the lever O back into its slot when the hammer-bar descends after the two parts have met. The hammer-bar is projected above the top of the foot K and has the bar P bolted to it. This bar P is extended forward and terminates with the hook $p$, which is inserted in the groove $h$ in the vertically-reciprocating plate H, whereby the hammer-bar is given a vertically-reciprocating movement. Also bolted to the upper end of the hammer-bar is a spring R, which passes through a slot in the bar P and presses down on the upper end of the foot K.

S is a spring-pressed dog which is pivotally secured to the upper end of the hammer-bar and engages the top of the foot-bar. It terminates with an inwardly-sloping end which at a predetermined point in the movement of the hammer-bar will contact with the pin $l^7$, which will throw the dog out of engagement with the foot-bar and allow the hammer-bar, by overcoming the tension of the spring R, to move down without carrying the foot-bar with it.

The extension $i^5$ has an enlargement $i^6$ at its lower end with a transverse opening in which the bushing $n$ is held by the set-screw $n'$. The bushing $n$ has a central opening through which the wire N to make the staples from is threaded. The wire N is pushed through until its end contacts with the opposite extension $i^4$, and the width of the space between the extensions $i^4$ and $i^5$ determines the length of the wire to be made into staples. The wire, as shown in Fig. 2, is immediately above the hook $o$. The lever O, of which the hook is a part, is pressed out into position under the wire N by means of the spring-pressed pin $O^2$. The wire for the staple is first cut off by the descending foot K and is bent over the hook $o$ into staple form by the continued downward movement of the foot, the staples being drawn up into the grooved slot $k$. At the moment the foot reaches the bottom of the plate $I^2$ the dog S strikes the pin $l^7$ and is thrown out of engagement with the foot K. The spring R holds the foot down against the slat, which at that juncture is underneath the head I, and the hammer-bar L continues to descend and causes the flange *l* to press the staple into the slat. Countersinks in the bed-plate made in the usual manner will turn the ends of the staples so as to clench them in the wood.

I will now describe the mechanism for feeding the staple-wire N into position to be cut into lengths and formed.

T is a disk with grooved periphery to engage the wire N, which is passed around the disk in the manner shown in Fig. 2. W is a pin to hold the wire close to the disk, and W' is a guide through which the wire after it leaves the disk is threaded. The disk T has an outside ratchet-wheel T' with hooked ratchet-teeth *t* to engage the hook $T^2$, which is fastened to and works with the hammer-bar L. The upward stroke of the hammer-bar moves the disk sufficiently to feed the wire in the length of one staple. To keep the wire from working back again, I provide the cam Z, with the weighted lever Z' adjusted so the wire can move forward, but will be locked against any return movement. All of the heads I are alike and further description is deemed unnecessary.

The machine, as shown in the drawings and here explained, is for making a shipping-case, the sides of which are constructed from a series of slats; but I am able to bind with wire and secure by staples tight boxes, that is, boxes the sides of which are made from one-piece material or one or more pieces to the side, the only change required being probably a difference in the spurs on the chain and in the absence of the feed-slides. The bed-plate is forced down with a cam and is brought up again by the weighted levers. By this construction the exact height of the bed-plate when it is raised will depend on the thickness of the material used for slats. This self-adjusting construction is a very important feature of my invention. It is quite apparent that springs might be substituted for the weights, and it is not desired to limit this invention to the use of weights.

Having thus fully described my invention, what I claim as new, and wish to secure by Letters Patent of the United States, is—

1. In a box-making machine, the combination with wiring and stapling mechanism, of a bed-plate on which the box material is placed, belts with spurs to engage the material and feed it across the bed-plate, said belts being actuated by the reciprocating movement of the bed-plate, revolving cams for lowering the bed-plate and springs or weights to impart a yielding force to the bed-plate whereby the same will be raised a variable distance according to the requirements as to thickness of the material into which the staples are driven, all substantially as described.

2. In a box-making machine, the combination with wiring and stapling mechanism, of the bed-plate B having vertical reciprocating movement controlled by suitable guides, weighted levers C to force the bed-plate up against the stapling-heads, cams D' to lower the bed-plate, link belts F with spurs to engage the slat material, said belt passing over sprocket-wheels in the manner as shown and described, and mechanism for actuating the sprocket-wheels so as to move the feed-belt, said mechanism consisting of a ratchet-wheel revolving with the sprocket-wheels and a pawl pivotally secured to the frame of the machine and engaging the ratchet-wheel so as to rotate same as it rises and falls with the bed-plate.

3. In a box-making machine, a bed-plate, revolving cams to force the bed-plate down and weighted levers to raise the bed-plate and means substantially as specified for feeding the material for the sides of the box across the bed-plate, in combination with binding-wires and wires to form the staples for fastening the binding-wires to the box sides, means substantially as described for delivering the binding-wire into proper position and means for making staples out of the wires provided for that purpose, said means consisting of a forming-hook over which the wire is fed, a forked bar to cut off the wire and bend it over the hook into a staple, and hold the staple against the strip and from spreading while it is driven and a bar to push the staple into the wooden strip, all substantially as set forth.

4. In a box-making machine, the combination with a reciprocating bed-plate to bring the material from which the box sides are made, into contact with the staple-driving mechanism, of a series of staple forming and driving heads and a pair of spools for each head each of which supplies a single wire to one of the heads and said heads each consisting of the following parts: an immovable body-plate $I^2$ having a pair of parallel flange-like extensions forming a slideway, and having a groove intermediate of the flange-like extensions, a lever pivoted at its upper end in said groove and having a hook on its lower end, a spring to press the lever so the hook will project beyond the bottom of the slideway, wire fed transversely across the slideway, above the hook, a forked bar working in the slideway to cut off the wire and bend it over the hook into a staple and hold the staple against the box-strip and from spreading while the staple is driven, a hammer-bar to drive the staple, having a flange to work in the slotted end of the forked bar and having a spring-pressed dog to engage the forked bar and force it down, a pin to throw the dog out and release the forked bar as described, a spring attached to the hammer-bar and bearing down on the forked bar, means for imparting a reciprocating movement to the hammer-bar, and means for feeding the wire into the slideway to be cut and formed into staples, said means consisting of a grooved disk having a ratchet-wheel actuated from the hammer-bar and a weighted clamp to hold the wire from back movement, all substantially as described and for the purposes specified.

5. In a box-making machine, the combination with a reciprocating bed-plate, link belts having spurs, said belts passing over the surface of the bed-plate and moved automatically by said reciprocating bed-plate to bring the material forming the sides of the box into contact with the stapling-heads of a stationary plate reaching from one side of the machine to the other and having a central longitudinal slot, staple forming and driving heads of the kind shown and described removably and adjustably secured to said stationary plate, a reciprocating plate parallel with the stationary plate, means substantially as described for transmitting a reciprocating motion to the said plate and means for connecting the plate with the hammer-bar of the staple forming and driving head, all substantially as described and for the purposes specified.

6. In a box-making machine of the kind specified, the standards A having the transverse bars A' and A², the platform B having vertical reciprocating movement controlled by ways formed in the frame of the machine, the revoluble shaft D having cams D' to force the bed-plate down, and weighted levers C to raise the bed-plate up, a link belt F having spurs $f$, said belt passing over the bed-plate, shafts F³ mounted in bearings secured to the bed-plate and having sprocket-wheels over which the link belts are passed, a ratchet-wheel mounted on one of said shafts and a pawl pivoted to the frame of the machine so as to engage the ratchet-wheel and actuate the link belts by the reciprocation of the ratchet-wheel, a stationary plate G having the longitudinal central slot $g$, the plate H connected with eccentrics on the shaft D whereby the plate H will be reciprocated by the revolution of said shaft D, the said plate H having the longitudinal groove $h$, the standards J² mounted on the bar A', and the spools J and J' mounted on each of the standards, and wire staple forming and driving heads I constructed substantially as described and removably and adjustably bolted to the slotted plate G and connected with the grooved plate H whereby the proper motion, at any position or adjustment of the heads I will be transmitted to the said heads, all of said parts being combined and arranged substantially in the manner as described and for the purposes specified.

In testimony whereof I affix my signature in presence of two witnesses.

JASON H. GREENSTREET.

Witnesses:
  JOSEPH A. MINTURN,
  F. W. WOERNER.